United States Patent Office 2,830,935
Patented Apr. 15, 1958

2,830,935
EPOXIDATION OF STEROIDS

Gilbert M. Shull, Huntington Station, and Barry M. Bloom, Jackson Heights, N. Y., assignors to Chas. Pfizer & Co., Inc., Brooklyn, N. Y., a corporation of Delaware No Drawing. Application August 1, 1955
Serial No. 525,808

1 Claim. (Cl. 195—51)

This invention is concerned with a method for the preparation of steroid epoxides by the use of microorganisms. The microbiological transformation of steroids has received considerable attention during the past several years. By selecting a suitable organism such diverse transformations as hydroxylation, side chain cleavage, nuclear hydrogenation and dehydrogenation, ring D enlargement, and the interconversion of hydroxyl and ketone groups may be carried out. This invention deals with a new type of microbiological steroid transformation, namely the conversion of an unsaturated steroid into the corresponding steroid epoxide. This type of microbiological transformation has not been previously described for steroids or other unsaturated compounds.

It has now been discovered that steroids containing an isolated double bond are converted into the epoxide by microorganisms capable of introducing an axial hydroxyl group at the site of the unsaturation. It is thus possible to prepare epoxide compounds for the first time by microbiological processes. Epoxide compounds have been prepared in the past by chemical methods. However, the reagents used are generally drastic and, therefore, rather difficult to use in the presence of sensitive groups. This disadvantage is overcome by the method of the present invention which is very gentle by comparison with chemical methods. Furthermore, the method of the present invention has the additional advantage in that no special equipment is necessary. This advantage is especially important in organizations where equipment for fermentation is readily available.

In carrying out the formation of epoxides by the method of this present invention, fermentations have been conducted in three ways: (1) in shake flasks with the steroid added after growth was established, (2) in vessels equipped for conducting submerged, aerated fermentations with the steroid added after growth was established, and (3) in the same fermentation vessel as in method (2) above, but in this case the mycelium was removed by filtration and resuspended in water. The steroid was then added and the fermentation continued.

As mentioned before, it is possible to prepare an epoxide compound by subjecting a steroid containing an isolated double bond to fermentation with a microorganism capable of introducing an axial hydroxyl group at the site of the unsaturation. When mention is made of an isolated double bond, it is understood to mean a double bond which is not in conjugation with another double bond. When an axial hydroxyl group is spoken of, the term axial is used in contrast with the term equatorial. These terms are used in the sense described by Barton in Experientia, volume 6, page 316, 1950.

The theoretical reasons for the fact that only isolated double bonds are converted to epoxide groups and then by only microorganisms capable of introducing an axial hydroxyl group at the site of the unsaturation are not clearly understood. Experiments, however, have demonstrated that double bonds in conjugation with other double bonds, for example a 4-position double bond in a 3-keto steroid or a 16-position double bond in a 20-keto steroid, are not attacked. It has also been demonstrated that microorganisms which introduce equatorial hydroxyl groups at the site of the unsaturation will not lead to the formation of epoxides.

It is extremely useful to have a microbiological method for producing epoxide compounds, since epoxide steroid compounds are very valuable as intermediates in the synthesis of other steroids. For example, in copending application Serial Number 459,848, filed October 1, 1954, a method is given for converting the compound $\Delta^4$-14$\alpha$, 15$\alpha$, epoxidopregnene-17$\alpha$, 21-diol-3, 20-dione into a very valuable compound, 14$\alpha$-hydroxy-compound F. In copending application Serial Number 466,943, filed November 4, 1954, a method is given for converting $\Delta^4$-9$\beta$, 11$\beta$-epoxidopregnene-17$\alpha$, 21-diol-3, 20-dione into the very valuable compound, 9$\alpha$-fluorohydrocortisone.

The following examples are given solely for the purpose of illustration and are not to be construed as limitations of this invention, many variations of which are possible without departing from the spirit or scope thereof.

EXAMPLE I

*Curvularia lunata* (NRRL–2380) was grown for 20–24 hours on Medium CQ.

Medium CQ

| | |
|---|---|
| Soybean meal | g__ 33.0 |
| $KH_2PO_4$ | g__ 1.43 |

Tap $H_2O$ to make 1000 cc.

The mycelium was removed by filtration and washed with water. Damp mycelium cake equivalent to 12.5 g. on a dry weight basis and 250 mg. of $\Delta^{4,14}$-pregnadiene-17$\alpha$, 21-diol-3, 20-dione ($\Delta^{14}$-dehydro-compound S) were suspended in 2000 cc. of $H_2O$ contained in a fermenter. After 8–24 hours stirring with aeration (0.5 volume of air per volume of medium per minute), the mycelium-steroid suspension was removed, extracted with chloroform, and the chloroform extract fractionation on a silica gel column. Crystals of a compound M. P. 202.5–204°, $[\alpha]_D^{31}+131.6°$ (dioxane) identical with $\Delta^4$-14$\alpha$, 15$\alpha$-epoxido-pregnene-17$\alpha$, 21 - diol - 3, 20 - dione prepared chemically were obtained. Paper chromatograms also indicated the presence of a compound with the same mobility as $\Delta^4$-14$\alpha$, 15$\alpha$-epoxidopregnene-11$\beta$, 17$\alpha$, 21-triol-3, 20-dione. Isolation of this compound by silica gel chromatography of the chloroform extract confirmed its identity with the 11$\beta$-hydroxylated 14,15-epoxido compound.

EXAMPLE II

Example I was repeated except that $\Delta^{4,9(11)}$-pregnadiene-17$\alpha$, 21-diol-3, 20-dione ($\Delta^{9(11)}$-dehydro-compound S) was incubated with the mycelium. Paper chromatograms indicated the presence of $\Delta^4$-9$\beta$, 11$\beta$-epoxidopregnene-17$\alpha$, 21-diol-3, 20-dione.

EXAMPLE III

*C. lunata* was grown on CT–2 medium

Medium CT–2

| | |
|---|---|
| Corn steep liquor | g__ 60.0 |
| Cerelose (dextrose hydrate) | g__ 10.0 |
| Lactose | g__ 20.0 |
| Corn meal | g__ 12.0 |
| $Na_2SO_4$ | g__ 1.0 |
| $CaCO_3$ | g__ 5.5 |
| Soybean oil | cc__ 2.0 |

Tap $H_2O$ to make 1000 cc.

for 20–24 hours and the mycelium was removed by filtration. Remainder of the procedure was the same as in Example I. The 9,11β-epoxide was produced from $\Delta^{9(11)}$-dehydro-S.

EXAMPLE IV

*C. lunata* was grown on CT-2 medium for 20–24 hours and then diluted with an equal volume of sterile water. To 2000 cc. of the diluted broth was added 180 mg. of $\Delta^{9(11)}$-dehydro-S. After 16 hours fermentation with aeration and agitation, chromatographic assays indicated approximately 18% of the substrate had been converted to the 9,11β-epoxide.

EXAMPLE V

*Helicostylum piriforme*, ATCC 8992, was transferred from a slant to a Fernbach flask containing 500 cc. of the following medium:

*Medium BR–1*

| | | |
|---|---|---|
| Malt extract (Difco) | g | 50.00 |
| Sucrose | g | 10.00 |
| NaNO$_3$ | g | 2.00 |
| KCl | g | 0.50 |
| MgSO$_4$.7H$_2$O | g | 0.50 |
| FeSO$_4$.7H$_2$O | g | 0.01 |
| K$_2$HOP$_4$ | g | 1.00 | pH 7.0.
H$_2$O to 1000 cc.

After shaking for 3 days at 28°, 50 mg. of $\Delta^{14}$-dehydro-S dissolved in 5 cc. acetone (sterilized by passing through a sintered glass bacteriological filter) was added. Three days after the steroid addition paper chromatographic assays of broth extract indicated 40% of the added steroid had been converted to $\Delta^4$-14α, 15α-epoxidopregnene-17α, 21-diol-3, 20-dione.

EXAMPLE VI

Example V was repeated except that 1200 mg. of $\Delta^{14}$-dehydro-S was distributed equally among 10 Fernbach flasks each containing 1000 cc. of 3 day old *H. Piriforme* growth. From this fermentation a compound was isolated by means of silica gel chromatography. The compound was identical with $\Delta^4$-14α, 15α-epoxidopregnene-17α, 21-diol-3, 20-dione in its infrared spectrum.

EXAMPLE VII

*Mucor parasiticus*, ATCC 6476 was grown on Medium BR–1 (see Example V). After 4 days 3–6% of the substrate $\Delta^{14}$-dehydro-S was converted into $\Delta^4$-14α, 15α-epoxidopregnene-17α, 21-diol-3, 20-dione according to chromatographic assay.

EXAMPLE VIII

*Cunninghamella blakesleeana*, ATCC 9245 was incubated with $\Delta^{14}$-dehydro-S for 16 hours in the same manner as outlined in Example I. $\Delta^4$-14α, 15α-epoxidopregnene-11β, 17α, 21-triol-3, 20-dione was demonstrated by paper chromatograms. None of the 14α, 15α-epoxido-S analog could be seen.

EXAMPLE IX

*C. blakesleeana* was incubated with 50 mg. of $\Delta^{14}$-dehydro-S in a shake flask as in Example V. Only the epoxido-compound F was found 3 days after the steroid addition.

EXAMPLE X

When the same conditions as in Example IX, above, were used except that the fermentation was terminated one day after steroid addition, a small amount of $\Delta^4$-14α, 15α-epoxidopregnene-17α, 21-diol-3, 20-dione was found.

EXAMPLE XI

*C. blakesleeana* was grown in a fermentor on 2000 cc. of the medium given below.

*Medium CL*

| | | |
|---|---|---|
| Soybean meal | g | 5.0 |
| Dextrose | g | 20.0 |
| Brewers yeast | g | 5.0 |
| NaCl | g | 5.0 |
| KH$_2$PO$_4$ | g | 5.0 |

NaOH to pH 6.4.
H$_2$O to 1000 cc.

After 17 hours of submerged aerated fermentation, 100 mg. of $\Delta^{14}$-dehydro-compound S was added. Twelve hours after the steroid addition, paper chromatograms indicated that about 2% of the substrate had been converted to $\Delta^4$-14α, 15α-epoxidopregnene-17α, 21-diol-3, 20-dione.

EXAMPLE XII

*Phycomyces blakesleeanus* was grown in shake flasks on Medium BR–1 (see Example V) and Medium CL (see Example XI). After 7 days at 28°, 50 mg. of $\Delta^{14}$-dehydro-S was added to each flask. After another four days shaking, a small amount of $\Delta^4$-14α, 15α-epoxidopregnene-17α, 21-diol-3, 20-dione was found on paper chromatograms of the extracts.

EXAMPLE XIII

The procedure of Example VII was repeated except that the organism *Mucor griseocyanus*, ATCC 1207a, was used. In this experiment, as in Example VII, $\Delta^{14}$-dehydro-S was converted to $\Delta^4$-14α, 15α-epoxidopregnene-17α, 21-diol-3, 20-dione.

EXAMPLE XIV

Example II was repeated except that the organism employed was *Curvularia brachysporia*. The results were as in Example II.

What is claimed is:

In a process for oxygenating steroids by fermenting with microorganisms capable of hydroxylation at the 11- or 14-positions of 11- or 14-methylene steroids, the improvement which consists of employing as the steroid reactant a steroid compound having from 18 to 21 carbon atoms in the nucleus and containing an isolated double bond selected from the class consisting of 9(11) and 14(15)-unsaturations, and recovering the steroid 9(11) or 14(15) epoxide thereby produced.

References Cited in the file of this patent

UNITED STATES PATENTS

| | | |
|---|---|---|
| 2,602,769 | Murray | July 8, 1952 |
| 2,705,711 | Dodson | Apr. 5, 1955 |

OTHER REFERENCES

Barton: Jour. Chem. Soc., 1953, page 1027.
Pincus et al.: The Hormones, vol. III, 1955, The Academic Press, New York, N. Y., page 524.